July 14, 1953  E. E. MEILSTRUP  2,645,140
DRILL JIG
Filed Dec. 20, 1950  2 Sheets-Sheet 1
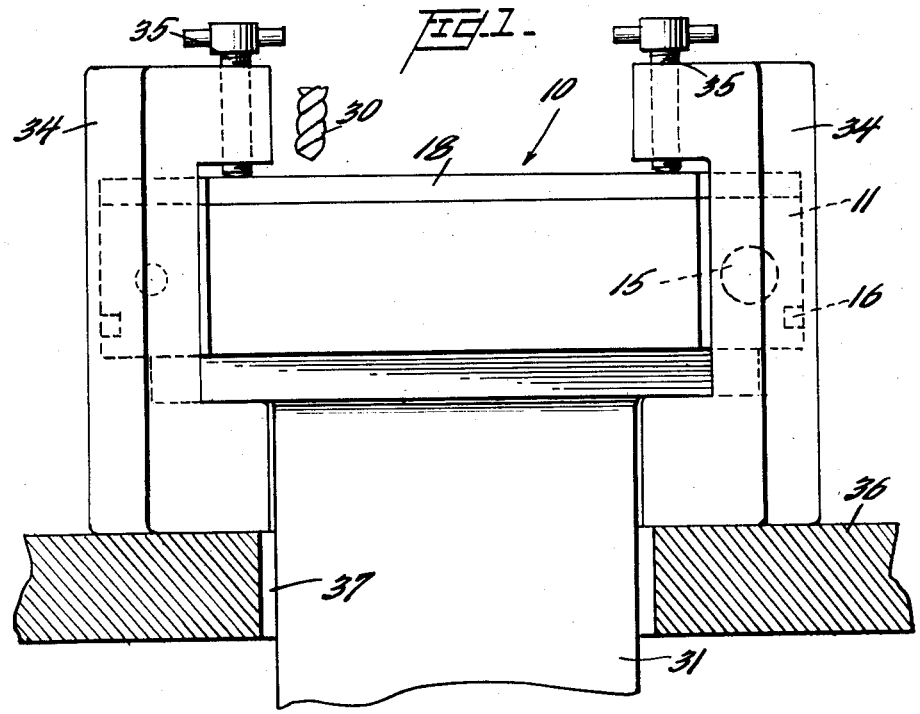
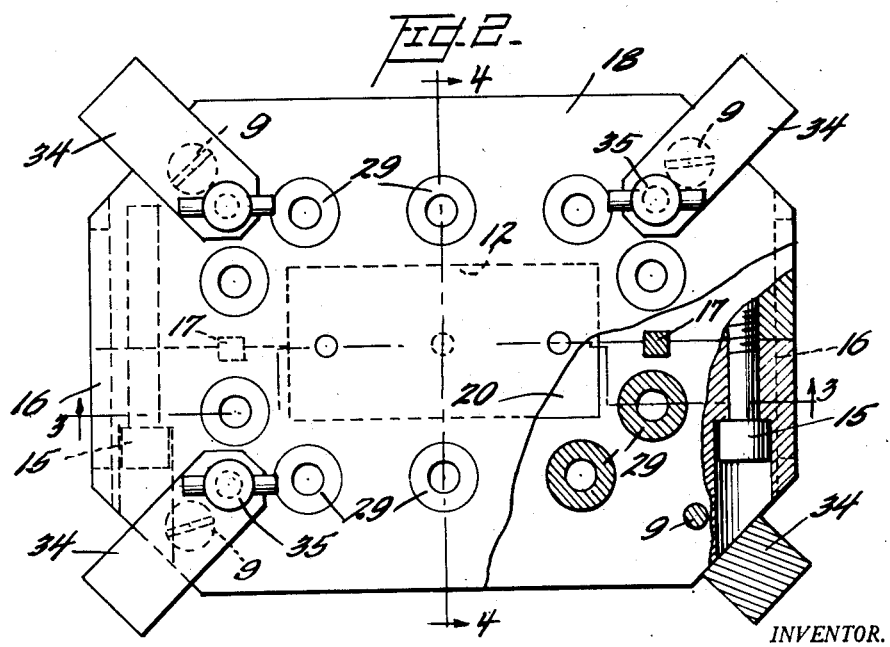
INVENTOR.
Emil E. Meilstrup
BY
C. B. Hamilton
ATTORNEY July 14, 1953  E. E. MEILSTRUP  2,645,140
DRILL JIG
Filed Dec. 20, 1950  2 Sheets-Sheet 2
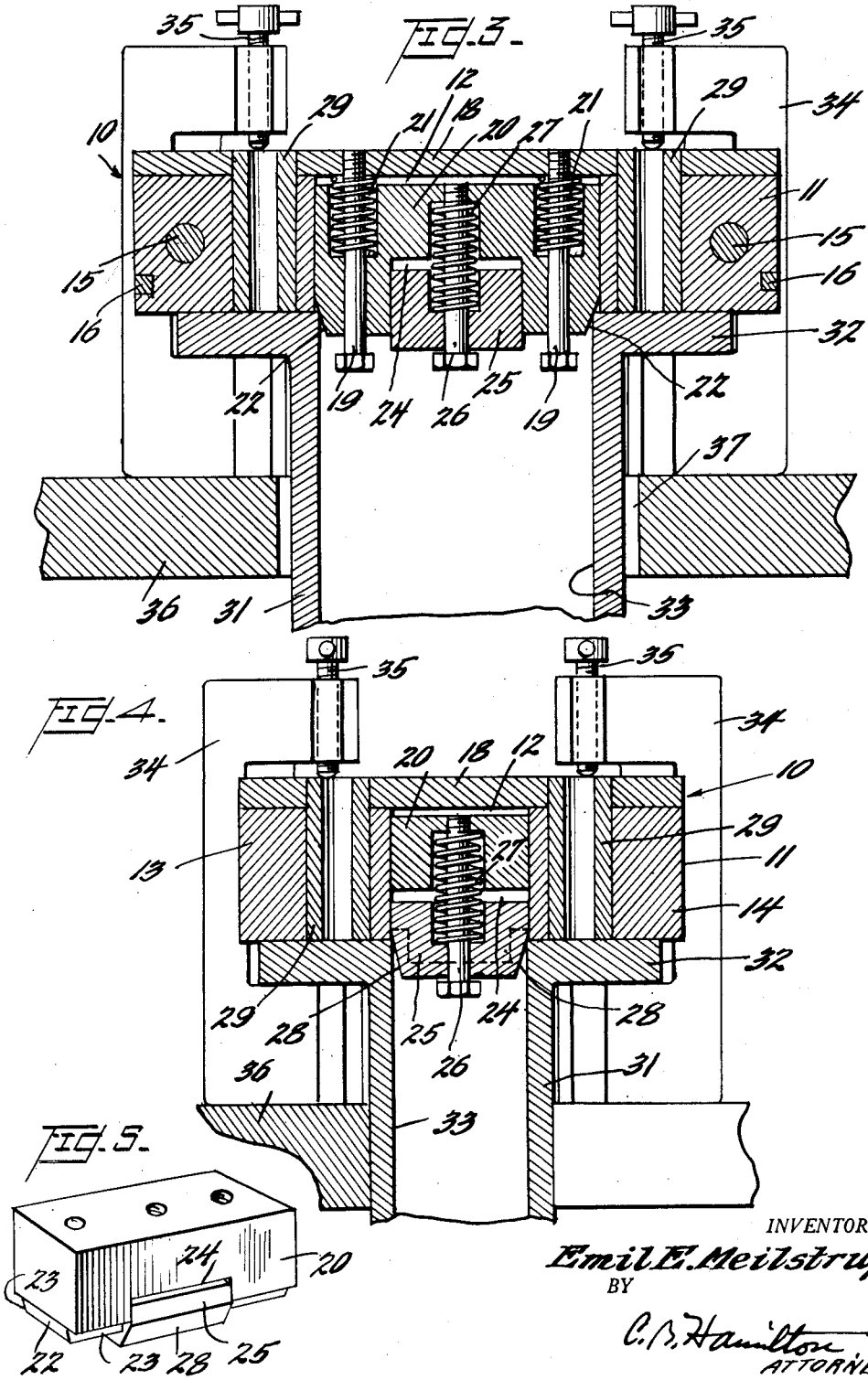
INVENTOR.
Emil E. Meilstrup,
BY
C. B. Hamilton
ATTORNEY Patented July 14, 1953

2,645,140

UNITED STATES PATENT OFFICE 2,645,140

DRILL JIG

Emil E. Meilstrup, Winston-Salem, N. C., assignor to Western Electric Company, Incorporated, New York, N. Y., a corporation of New York Application December 20, 1950, Serial No. 201,757

10 Claims. (Cl. 77—62)

1

This invention relates to work positioning and gaging fixtures and more particularly to a combined template, gage and tool jig for wave guides used in radar.

In the use of radar wave guides, which are abutted at their drilled flanges and secured by bolts, it is essential that the inner contours or walls of such wave guides be accurately and micrometrically aligned. Therefore, it is necessary that the drilled apertures in the flanges of each and every wave guide have a definite and uniform relation to the inner contour thereof.

Accordingly, one object of this invention is the provision of a quickly operable combined template and tool jig for accurately locating points to be worked on a flange of a hollow wave guide in definite and uniform relation to the contour of the wave guide so that the contours of similar wave guides, likewise worked, will be accurately aligned when assembled.

Another object is the provision of a combined template and tool jig for simultaneously gaging tolerances of the inner dimensions of a hollow wave guide while locating points to be drilled in the flange of a wave guide.

In accordance with the above objects, in one embodiment of the invention, particularly designed for use in drilling apertures in flanges of hollow wave guides of rectangular contour, there is provided a base which rests on a surface of the flange to be worked and a template secured to the base having apertures coinciding with apertures in the base, which correspond in arrangement to the exact location of points to be drilled. Depending centrally from the template and positioned within the base are a pair of bolts upon which a guide and gage block is slidably mounted. Slidably mounted within this guide block is a second guide and gage block, which, together with the first guide block, is partially inserted in a hollow of the wave guide to be worked. The depth of the insertion is dependent upon the dimensions of the hollow.

The insertion of the guide blocks accurately positions the template and base above the flanged part and a series of clamps are then applied to the template and the underside of the flange to move the base and template relative to the guide blocks and into contact with the flange. If the inner dimensions of the hollow wave guide are within predetermined limits the clamps will firmly seat the base against the surface of the flange; if, however, the dimensions are not within these limits, the base will either rest against the flange without the aid of the clamps thereby indicating

2 an oversized hollow or will fail to contact the flange with the aid of clamps indicating that the dimensions of the hollow or opening are undersized.

Other features and advantages of the invention will become apparent from the following detailed description, when taken in conjunction with the accompanying drawings, in which Fig. 1 is a front elevation of a work positioning jig embodying the features of the invention and shown operatively secured to a wave guide to be worked upon;

Fig. 2 is a plan view, partly in section, of the jig shown in Fig. 1;

Fig. 3 is a vertical section of the jig taken on line 3—3 of Fig. 2 showing one of the guide and gage blocks in contact with the internal walls of the hollow wave guide;

Fig. 4 is another vertical section of the jig taken on line 4—4 of Fig. 2 showing the other guide and gage block in contact with the internal walls of the hollow wave guide; and Fig. 5 is a perspective view of the two gage and guide blocks shown in operative association.

Referring now to the drawings, wherein like reference numerals designate the same elements throughout the several views, and more particularly to Figs. 3 and 4 wherein a guiding and gaging fixture, indicated generally by the numeral 10, is shown comprising a base 11 having a centrally located rectangular aperture 12. This central aperture 12 is formed by joining two U-shaped sections 13 and 14, which comprise the base 11, by means of two securing machine screws 15. A pair of keys 16 and 17 prevent lateral or longitudinal movement of the U-shaped pieces 13—14.

A template 18 is secured to the top of the base 11 by four machine screws 9 (Fig. 2). Depending from the template 18 within the aperture 12 is a pair of bolts 19 upon which a guide and gage block 20 is slidably mounted. The rectangular guide block 20 contacts the four walls of the aperture 12 and is of such thickness that when it contacts the lower surface of the template 18, a portion will extend below the underside of base 11. A pair of compression springs 21, concentrically mounted about bolts 19, normally urge the guide and gage block 20 against the heads of bolts 19.

The lower portion of guide and gage block 20 is tapered on two diametrically opposed ends at 22 and indented along the entire length thereof at 23 (Fig. 5) so that the dimensions of the underside of guide and gage block 20 correspond to the minimum tolerance permissible in the internal dimensions of a hollow article to be worked. The dimensions of the guide and gage block 20 above the tapered ends 22 and the indented sides 23 constitute the maximum tolerance permissible in the internal dimensions of the article to be worked. The lower central portion of guide and gage block 20 is slotted at 24 to accommodate a second guide and gage block 25, which is slidably mounted on a bolt 26 secured to and depending from the block 20 in the slot 24. A compression spring 27 (Figs. 3 and 4), concentrically mounted about bolt 26 normally urges guide and gage block 25 against the head of bolt 26.

Guide and gage block 25 is tapered along the lower portions of two diametrically opposed sides 28 which extend beyond the indentations 23 of guide and gage block 20 (Fig. 5). Guide block 25 is movable relative to guide and gage block 20; thus, the tapered sides 22 and 28 of guide and gage blocks 20 and 25, respectively, cooperate to firmly seat the gaging fixture 10 with respect to the internal contours of hollow articles of various sizes. Spaced hardened bushings 29 are secured within aligned holes in the base 11 and the template 18. These bushings 29 guide drills 30 (Fig. 1) of a drill press (not shown) into engagement with the article to be worked which is accurately positioned within the gaging fixture 10. In addition to properly locating the fixture 10 relative to the internal contour of the article, the guide and gage blocks 20 and 25 also establish the center lines of the article in directions at right angles to each other.

In using the gaging and guiding fixture 10, a hollow wave guide 31 is first positioned with its flange 32 uppermost. The guiding and gaging fixture 10 is then positioned over the flange 32 and lowered, thereby partially inserting the guide and gage blocks 20 and 25 into the wave guide 31. If the internal dimensions of the wave guide 31 are greater than maximum tolerance, the tapered sides 22 and 28 of the guide and gage blocks 20 and 25, respectively, will not engage the edges of the internal walls 33 of wave guide 31, and as a result the base 11 will contact flange 32 thus gaging and indicating the oversized condition of the wave guide.

Should the tapered sides 22 and 28 of guide and gage blocks 20 and 25, respectively, contact the edges of the internal walls 33 of a wave guide 31, the base 11 will be supported above the flange 32. Clamps 34 are then applied to the upper surface of template 18 and the underside of flange 32. Thumb screws 35 of the clamps 34 are then adjusted to move the fixture 10 toward flange 32 against the restraint of compression springs 21 and 27. If the internal dimensions of the wave guide 31 are less than minimum tolerance, the blocks will not enter into the hollow of the wave guide and will be forced upward so that the upper surface of guide and gage block 20 will contact the under surface of the template 18 and thus prevent the base 11 from contacting the flange 32. The resultant space between the base 11 and the flange 32 will indicate to the operator that the internal dimensions of wave guide 31 are less than minimum tolerance. If, upon adjusting thumbscrews 35 and moving the fixture 10 toward flange 32, the base 11 contacts flange 32, the internal dimensions of wave guide 31 are within predetermined tolerances and the wave guide is acceptable.

The assembled gaging fixture and wave guide are then moved to a drill press of any suitable type and mounted on a bed plate 36 thereof by sliding the assembly through a slot 37 in the bed plate. The assembly which is supported by clamps 34 resting on the bed plate 36, is now in position for drilling the flanges of the wave guide in accurate locations.

Although the above description specifically refers to drilling holes in the flange of a hollow wave guide, it is obvious that any flanged tubular article may be similarly worked upon.

It will be understood that the embodiment herein described is merely illustrative of the invention and that modifications can be made without departing from the spirit or scope of the invention.

What is claimed is:

1. In a jig for locating points to be drilled in a flange of a hollow wave guide with respect to the internal contours of the wave guide, a base, a template secured to said base, a first guide block slidably and partially positioned within the base, a second guide block slidably mounted to said first guide block and partially positioned within said base, said guide blocks contacting edges of the internal walls of the wave guide to orient said template with respect to the flanges of the wave guide, and means to move the base relative to said guide blocks and into contact with the flange of the wave guide to lock said template in its oriented position.

2. In a gage for checking the internal dimensions of a hollow member, a base, a first gaging means slidably mounted within the base, a second gaging means slidably mounted within the first gaging means, resilient means for restraining movement of said gaging means, said first and second gaging means having tapered sides for insertion into the hollow member, said tapered sides varying in dimensions corresponding to the allowable tolerances permissible in the internal dimensions of the said member, and means to move said base relative to said gaging means against the force of said restraining means and toward the member to determine if the tapered sides are in contact with the internal edges of the member.

3. In a jig for locating points to be worked on a hollow wave guide, a base, a template secured to said base, said base and template having apertures corresponding to the points to be worked, a first guide block having a slot in the under portion thereof, a second guide block slidably mounted within said slot, said guide blocks having tapered sides for orienting said template with respect to the wave guide, a recess in said base in which the guide blocks are positioned, resilient means for positioning the guide blocks with their tapered sides extending beyond the under surface of said base whereby the tapered sides will first contact the wave guide, and means to move the base relative to said guide blocks and into contact with the wave guide to lock said template in its oriented position.

4. In a fixture for locating points to be worked on a hollow wave guide, a base having a centrally located aperture a template secured to said base, a pair of members secured to the template and depending into the said aperture, a first guide block slidably mounted on said depending members and having a slot in the under portion thereof, an element secured to the first guide block and depending into the slot therein, a second guide block positioned within the slot and slidably mounted on the depending element, said guide blocks having tapered sides for insertion into a wave guide being worked to orient the template with respect to the internal contour of said wave guide, individual resilient means mounted about the said depending members and the depending element to urge the guide blocks outward whereby the tapered sides will extend beyond the said base and thus first contact the wave guide, and means to move the base relative to said guide blocks and against the restraint of the resilient means into contact with the internal contours of the wave guide.

5. In a fixture for determining the accuracy of the internal dimensions of a flanged hollow wave guide and for locating points to be drilled in the flange of the hollow wave guide, a base, a template secured to said base, a first guide and gage block slidably mounted within said base, a second guide and gage block slidably mounted within the first guide and gage block, separate resilient means for restraining the motion of both of said guide and gage blocks, said guide and gage blocks having tapered sides for insertion into the hollow wave guide for orienting said wave guide with respect to said template and simultaneously gaging the internal dimensions thereof for acceptability, said tapered sides varying in dimension according to the allowable variation in the interior dimensions of the hollow wave guide, and means to move said base and said template relative to said blocks against the force of the resilient means and toward the hollow wave guide to determine if the tapered sides are in contact with the internal edges of the wave guide and to clamp the wave guide in its oriented position with respect to said template when the wave guide is within acceptable tolerances.

6. In a combined gaging and positioning device for orienting hollow wave guides to be drilled when the interior dimensions of said wave guides are within permissible tolerances, a base having an aperture therein, a template secured to said base, a pair of members secured to the template and depending into said aperture, a first guide and gage block slidably mounted on said depending members and having a slot in the under portion thereof, an element secured to the first guide and gage block and depending into the slot therein, a second guide and gage block positioned within the slot and slidably mounted on the depending element, said guide and gage blocks having sides tapered according to the variation between the maximum and minimum tolerances in the interior dimensions of the wave guide, said tapered sides being inserted into the wave guide to orient the template with respect to said wave guide and to simultaneously determine if the interior dimensions of the wave guide are within the allowable tolerances, individual resilient means mounted about said depending members and said depending element to urge the guide blocks toward the wave guide whereby the tapered sides will extend beyond the said base and thus first contact the wave guide, and means to move the base and template relative to said guide and gage blocks and against the restraint of the resilient means into contact with the internal contours of the wave guide.

7. In a gage for determining maximum and minimum tolerances of internal dimensions of a hollow member, a base, a gaging means having a plurality of cooperatively slidable parts mounted in the base, said parts having tapered sides varying in dimensions corresponding to the allowable tolerances permissible in the internal dimensions of the hollow member, resilient means to restrain movement between the gage means and the base, and means to move the base against the restraint of the resilient means relative to the gage means and toward the hollow member to firmly seat the tapered parts within the hollow of the member and the base against the said member.

8. In a jig for locating points on a tubular member with respect to the internal contour thereof, a base, a template for locating the points and secured to said base, a plurality of cooperatively slidable guide blocks positioned in the base and having tapered sides varying in dimensions corresponding to the allowable tolerances of the internal dimensions of the tubular member, said tapered sides adapted to contact the edges of the internal walls of the tubular member thereby orienting the attached template into a predetermined fixed position with respect to the internal contour of the tubular member, means to clamp the base to the tubular member, and resilient means to hold the guide blocks in contact with the internal edges of the walls of the tubular member.

9. In a jig for establishing the location of points on a tubular member in fixed relation to the contour of the hollow of the said member and for determining if the interior dimensions thereof are within allowable tolerances, a base, a template secured to the base for determining the location of the fixed points, gaging and orienting means slidably mounted on the template and within the base, said gaging and orienting means having tapered sides adapted to contact the edges of the internal walls of the tubular member whereby the attached template is oriented with respect to the internal contour of the tubular member and the acceptability or non-acceptability of the dimensions of said contour simultaneously determined, resilient means to restrain relative movement between the gaging and orienting means and the base, and means to move said base and template against the restraint of said resilient means and toward the tubular member to actuate the gaging and orienting means into a desired adjustment by contact of the tapered sides with the edges of the internal walls of the tubular member.

10. In a jig for gaging tubular members and orienting a template with respect thereto, a base, a template secured to said base, gaging and orienting means movably attached to the template, said gaging and orienting means having a plurality of cooperatively slidable members positioned within the base, said members having tapered sides varying in dimensions corresponding to the allowable tolerances permissible in the internal dimensions of the tubular member and adapted to contact the edges of the internal walls of the tubular member to orient the template with respect to the tubular member and simultaneously to gage the hollow of the tubular member, and means to move the base relative to the gaging and orienting means and into contact with the tubular member to secure the template in the oriented position.

EMIL E. MEILSTRUP.

References Cited in the file of this patent

UNITED STATES PATENTS

| Number | Name | Date |
|---|---|---|
| 1,199,284 | Lieser | Sept. 26, 1916 |
| 1,414,635 | Fine | May 2, 1922 |
| 1,547,595 | Lofland | July 28, 1925 |
| 2,412,459 | Stull | Dec. 10, 1946 |
| 2,454,159 | Graves | Nov. 16, 1948 |